(12) United States Patent  
Liao

(10) Patent No.: US 12,474,805 B1
(45) Date of Patent: Nov. 18, 2025

(54) SENSING TOUCHPAD

(71) Applicant: PIXART IMAGING INC., Hsin-Chu (TW)

(72) Inventor: Chi-Chieh Liao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/800,204

(22) Filed: Aug. 12, 2024

(51) Int. Cl.
*G06F 3/041* (2006.01)
*G06F 3/044* (2006.01)

(52) U.S. Cl.
CPC ........ *G06F 3/0445* (2019.05); *G06F 3/04164* (2019.05); *G06F 3/0446* (2019.05); *G06F 2203/04107* (2013.01)

(58) Field of Classification Search
CPC .. G06F 3/0445; G06F 3/0446; G06F 3/04164; G06F 2203/04107
See application file for complete search history.

(56) References Cited

U.S. PATENT DOCUMENTS

2021/0255737 A1* 8/2021 Kida ................ G06F 3/0445

* cited by examiner

*Primary Examiner* — Deeprose Subedi
(74) *Attorney, Agent, or Firm* — Li & Cai Intellectual Property (USA) Office

(57) ABSTRACT

A sensing touchpad includes a substrate, a plurality of first driving electrodes, a plurality of sensing electrodes, at least one second driving electrode and at least one ground element. The substrate has a first surface and a second surface opposite to each other. The plurality of first driving electrodes are arranged in a first layer on the top surface of the substrate. The plurality of sensing electrodes are arranged in a second layer on the first layer. The at least one second driving electrode is arranged in the second layer. The at least one ground element is arranged in the first layer, and the at least one ground element overlaps with the at least one second driving electrode on a normal direction of the substrate.

14 Claims, 5 Drawing Sheets

SENSING TOUCHPAD

FIELD OF THE DISCLOSURE

The present disclosure relates to a touchpad, and more particularly to a sensing touchpad capable of preserving its touch sensitivity and performance while utilizing an architecture with a small quantity of layers.

BACKGROUND OF THE DISCLOSURE

For certain complex touchpad applications, such as pressure-sensitive haptic feedback touchpads, the required PCB layers are often more than 4. To save the use of bridge through holes, the design usually includes a sensing layer, a driving layer, a ground shielding layer, and a partial trace routing layer, and electronic packaging components can be disposed on the partial trace routing layer.

Alternatively, driving electrodes and sensing electrodes can be placed in the same layer, but additional bridge though holes must be utilized to interconnect two of the driving electrodes.

However, in certain touchpad applications, it is necessary to use electronic packaging components with a large quantity of pins, for example, ball grid array (BGA) packaging components. Since the traces connected to the BGA package needs to use a large quantity of blind vias under the BGA, making the ground shielding layer incomplete, thereby losing the shielding effect for the driving electrodes.

To maintain the shielding effect, the existing practice is to increase the number of layers, but it will increase the cost and also affect the touch performance.

SUMMARY OF THE DISCLOSURE

In response to the above-referenced technical inadequacies, the present disclosure provides a sensing touchpad capable of preserving its touch sensitivity and performance while utilizing an architecture with a small quantity of layers.

In order to solve the above-mentioned problems, one of the technical aspects adopted by the present disclosure is to provide a sensing touchpad, which includes a substrate, a plurality of first driving electrodes, a plurality of sensing electrodes, at least one second driving electrode and at least one ground element. The substrate has a first surface and a second surface opposite to each other. The plurality of first driving electrodes are arranged in a first layer on the top surface of the substrate. The plurality of sensing electrodes are arranged in a second layer on the first layer. The at least one second driving electrode is arranged in the second layer. The at least one ground element is arranged in the first layer, and the at least one ground element overlaps with the at least one second driving electrode on a normal direction of the substrate.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
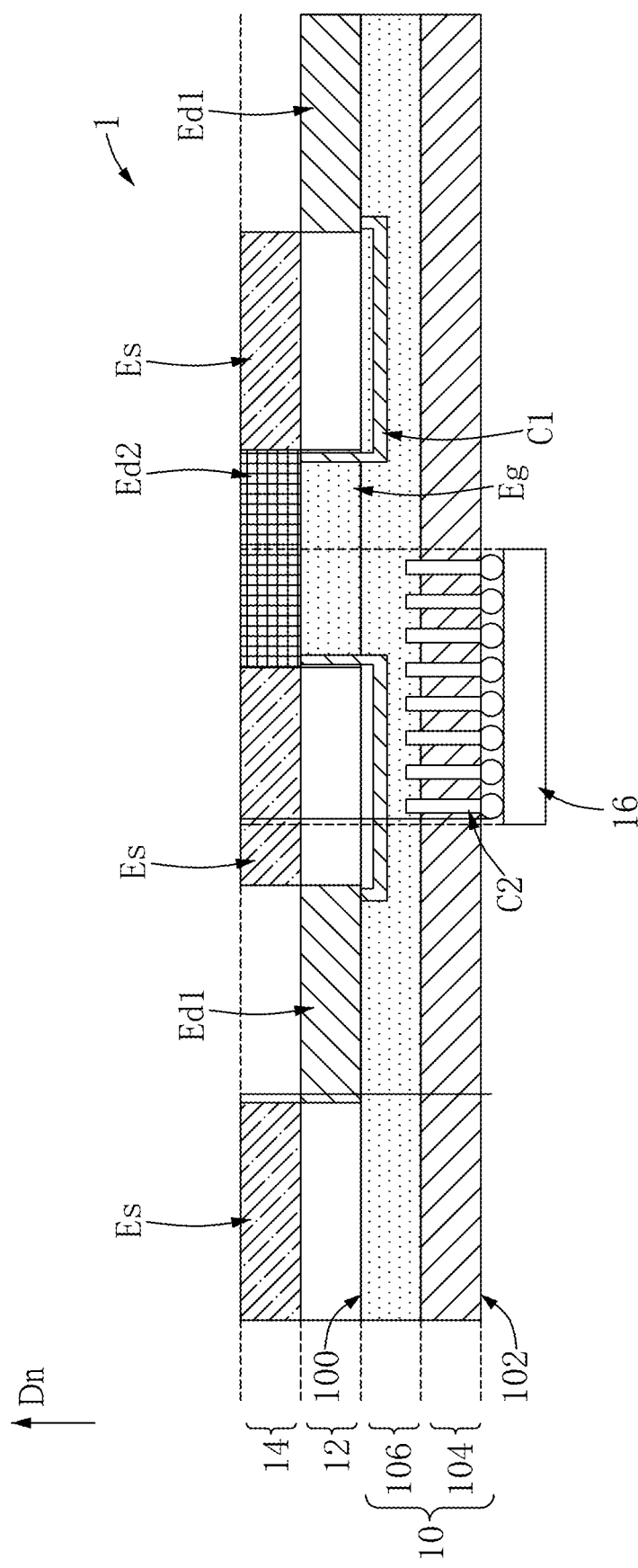
FIG. 1 is a schematic side view of a sensing touchpad according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic side view of a sensing touchpad according to one embodiment of the present disclosure. Referring to FIG. 1, one embodiment of the present disclosure provides a sensing touchpad 1, which includes a substrate 10, a plurality of first driving electrodes Ed1, a plurality of sensing electrodes Es, one or more second driving electrodes Ed2 and one or more ground element Eg.

The substrate 10 has a first surface 100 and a second surface 102 opposite to each other. The plurality of first driving electrodes Ed1 are arranged in a first layer 12 on the top surface 100 of the substrate 10. The plurality of sensing electrodes Es are arranged in a second layer 14 on the first layer 12. It should be noted that any adjacent two of the substrate 10, the first layer 12 and the second layer 14 can be provided with an intermediate layer therebetween, and the intermediate layer can be made of a glass-reinforced epoxy laminate material, such as FR-4.

The substrate 10 defines a normal direction Dn that is perpendicular to the top surface 100 of the substrate 10, and the substrate 10, the first layer 12 and the second layer 14 are stacked along the normal direction Dn.

However, the aforementioned details of the sensing touchpad 1 are disclosed for exemplary purposes only, and are not meant to limit the scope of the present disclosure. For example, in other embodiments of the present disclosure, a protective layer made of a transparent material (e.g., glass) can be disposed on the second layer 14, so as to protect the components (e.g., the driving electrodes and the sensing electrodes) of the sensing touchpad 1 from being damaged.

The sensing touchpad 1 further includes a sensing chip 16 mounted on the second surface 102. The sensing chip 16 can be an electric package component, such as a ball-grid array (BGA) packaged chip. The sensing chip 16 is electrically connected to the plurality of first driving electrodes Ed1, the plurality of sensing electrodes Es and the second driving electrodes Ed2. A quantity of the sensing chip 16 can be one or more, and the present disclosure does not limit the quantity of the sensing chip 16.

The sensing chip 16 can be a controller, a processor or other processing circuits, and is configured to transmit driving signals to the first driving electrodes Ed1 and the second driving electrodes Ed2, and receive sensing signals from the sensing electrodes Es. The sensing touchpad 1 can be a capacitive touchpad 1 that senses user's touch according to a variance of capacitance formed among the driving electrodes and the sensing electrodes, such as a self-capacitance or mutual-capacitance, but the present disclosure is not limited thereto.

Figure 2:
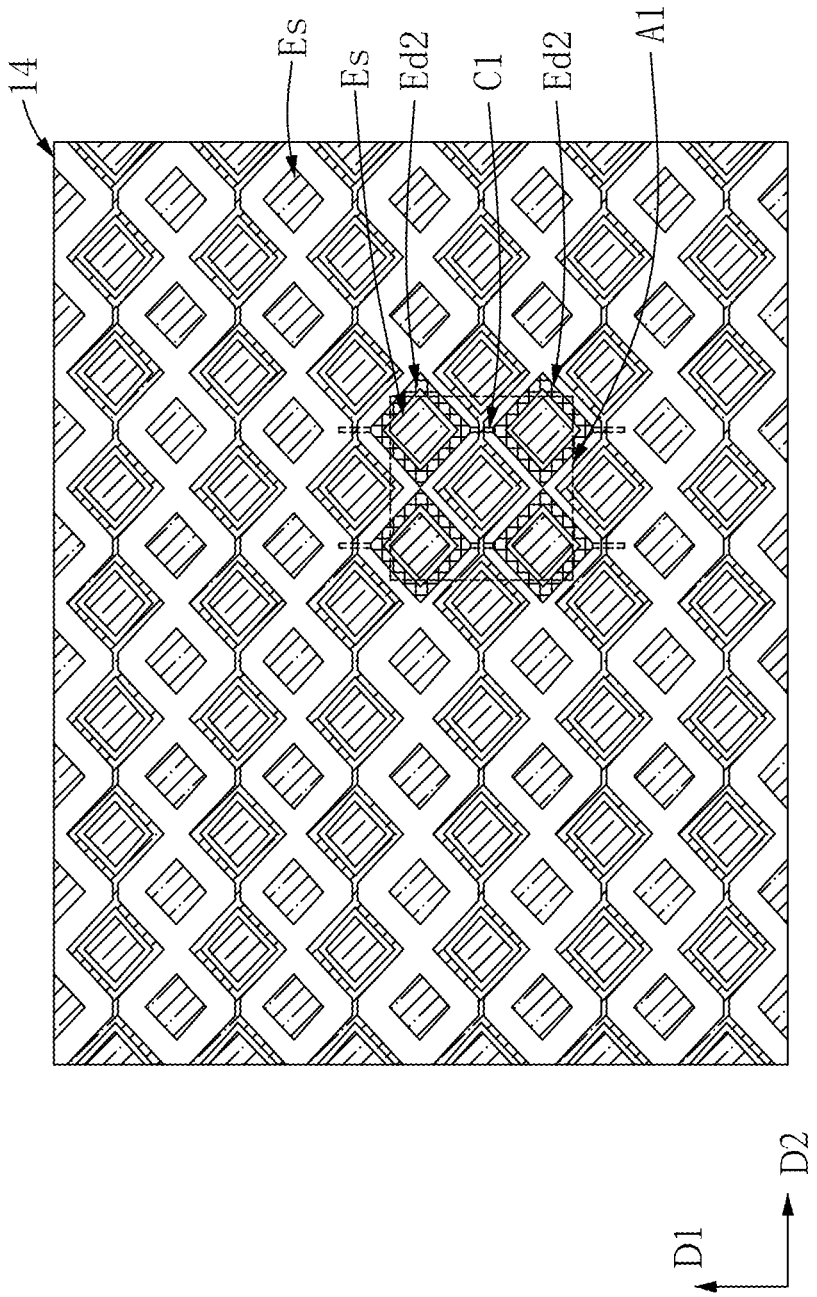
FIG. 2 is a schematic top view of a second layer of the sensing touchpad according to one embodiment of the present disclosure.

FIG. 2 is a schematic top view of the second layer 14 of the sensing touchpad according to one embodiment of the present disclosure. Referring to FIG. 2, the sensing electrodes Es are spaced apart from one another, and the sensing electrodes Es are arranged in a form of matrix and can include a plurality of first rows and a plurality of second rows that are alternately arranged along a first direction D1. In each of the first rows, the sensing electrodes Es are isolated with one another and are all diamond shaped and solid. In each of the second rows, the sensing electrodes Es include a plurality of diamond-shaped frame electrodes and a plurality of diamond-shaped electrodes that are respectively disposed within hollow portions of the diamond-shaped frame electrodes, and the diamond-shaped frame electrodes are connected in series along a second direction D2. However, the aforementioned details of the sensing electrodes Es are disclosed for exemplary purposes only, and are not meant to limit the scope of the present disclosure.

Furthermore, the second driving electrodes Ed2 are arranged in an area A1 and overlap with the sensing chip 16 along the normal direction Dn. More specifically, the area A1 is an area of the sensing chip 16 projected onto the second layer 14, and in the area A1, each of the second driving electrodes Ed2 can be disposed between a space between one of the first rows and one of the second rows of the matrix formed by the sensing electrodes Es. In the present embodiment, each of the second driving electrodes Ed2 can be a diamond-shaped electrode. In some embodiments, each of the second driving electrode Ed2 can be in alignment with one of the sensing electrodes Es. For example, as shown in FIG. 2, each of the second driving electrodes Ed2 surround corresponding one of the sensing electrodes Es of the first rows, which is diamond-shaped.

Figure 3:
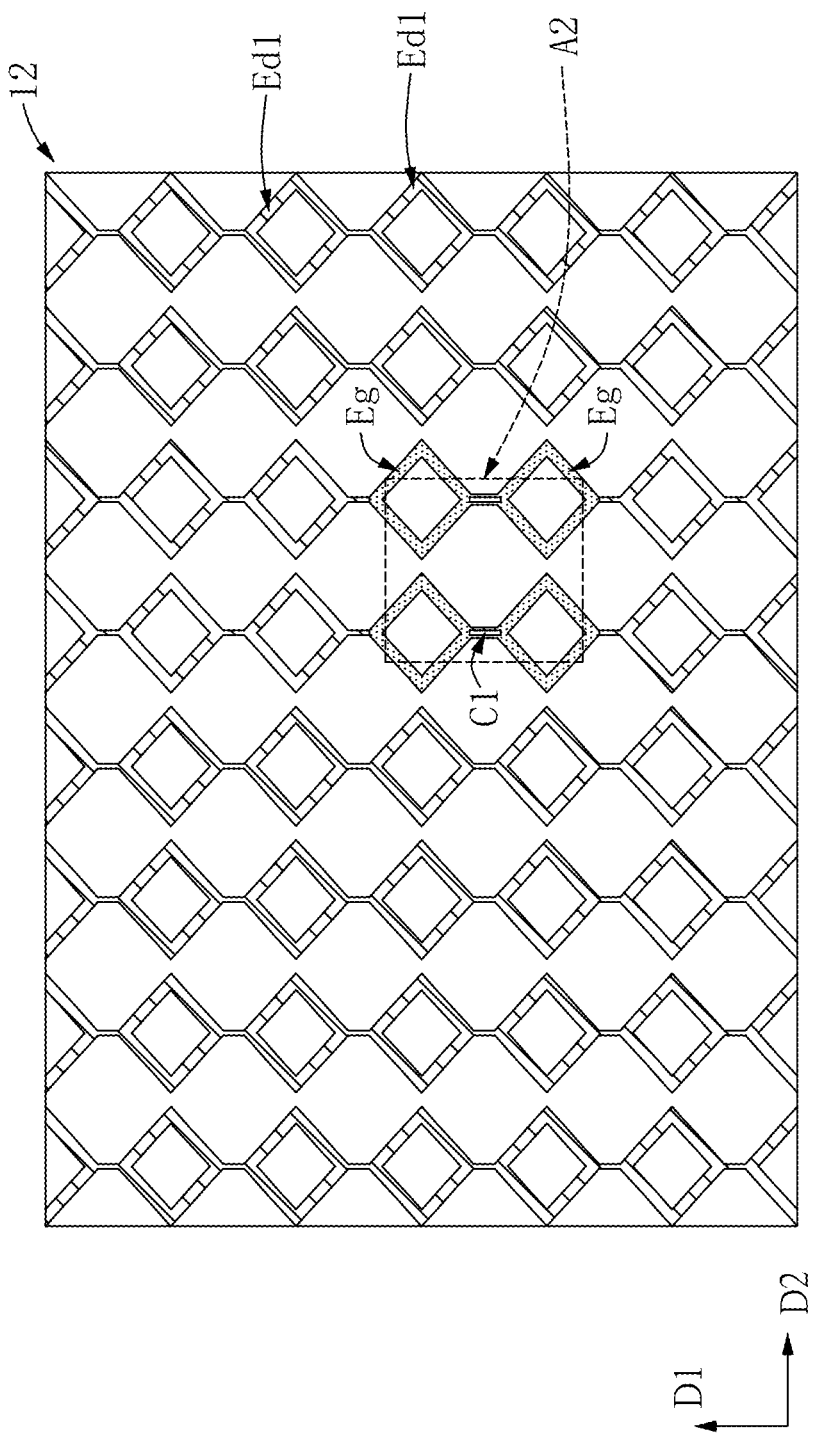
FIG. 3 is a schematic top view of a first layer of the sensing touchpad according to one embodiment of the present disclosure.

FIG. 3 is a schematic top view of the first layer 12 of the sensing touchpad according to one embodiment of the present disclosure. Referring to FIG. 3, the plurality of first driving electrodes Ed1 can be arranged in a matrix with one or more empty elements. For example, the matrix formed by the first driving electrodes Ed1 has a plurality of columns arranged along the second direction D2. In each of the columns, the first driving electrodes Ed1 are connected in series along the first direction D1, and each of the first driving electrodes Ed1 is a diamond-shaped electrode. In one embodiment, the first driving electrodes Ed1 are not arranged in an area A2 that is an area of the sensing chip 16 projected onto the first layer 12. Therefore, the matrix formed by the first driving electrodes Ed1 has one or more empty elements that overlap with the sensing chip 16, that is, the first driving electrodes Ed1 do not overlap with the sensing chip 16 along the normal direction Dn.

Furthermore, the ground elements Eg can be arranged at positions of the empty elements of the matrix formed by the first driving electrodes Ed1, that is, the ground elements Eg can be arranged in the area A2 and overlap with the sensing chip 16 along the normal direction Dn.

Different from the existing arrangement of the driving electrodes that are all arranged in the same layer, in the present embodiment, some of the driving electrodes that overlap with the sensing chip 16, such as the second driving electrodes Ed2 shown in FIGS. 1 and 2, can be arranged in the second layer 14. It should be noted that FIG. 1 merely schematically shows the arrangement of the second driving electrode Ed2 and the sensing electrodes Es, and the second driving electrode Ed2 is electrically isolated from any of the sensing electrodes Es.

Since the driving electrode that overlaps with the sensing chip 16 is arranged in the second layer 14, the ground element Eg can be arranged at a space corresponding to the second driving electrode Ed2 in the first layer 12. Therefore, the ground elements Eg can serve as shielding elements between the second driving electrode Ed2 and the substrate 10 along the normal direction Dn.

Moreover, referring to FIG. 1, the second driving electrode Ed2 can electrically connected to the first driving electrode Ed1 on the left side of the second driving electrode Ed2 through a first conductive element C1 located in the ground element Eg. Similarly, the second driving electrode Ed2 can electrically connected to the first driving electrode Ed1 on the right side of the second driving electrode Ed2 through another first conductive element C1 located in the ground element Eg. In some embodiments, the first conductive element C1 can be a conductive via or a conductive through-hole.

The substrate 10 can include a third layer 104 and a fourth layer 106 arranged on the third layer 104, and the first layer 12, the second layer 14, the third layer 104 and the fourth layer 106 are stacked along the normal direction Dn. It should be noted that any adjacent two of the third layer 104, the fourth layer 106, the first layer 12 and the second layer 14 can also be provided with an intermediate layer therebetween, and the intermediate layer can be made of a glass-reinforced epoxy laminate material, such as FR-4.

The fourth layer 106 can be formed by conductive material and serve as a ground shielding layer. In one embodiment, the fourth layer 106 can be connected to a ground signal source for receiving a ground signal. The ground element Eg can be made of a material as the same as the fourth layer 106, which means that the ground element Eg can extend from the fourth layer 106 to the first layer 12 along the normal direction Dn.

Therefore, the first conductive element C1 can serve as a bridge through hole that penetrates through the ground element Eg and the ground shielding layer (i.e., the fourth layer 106) of the substrate 10.

Figure 4:
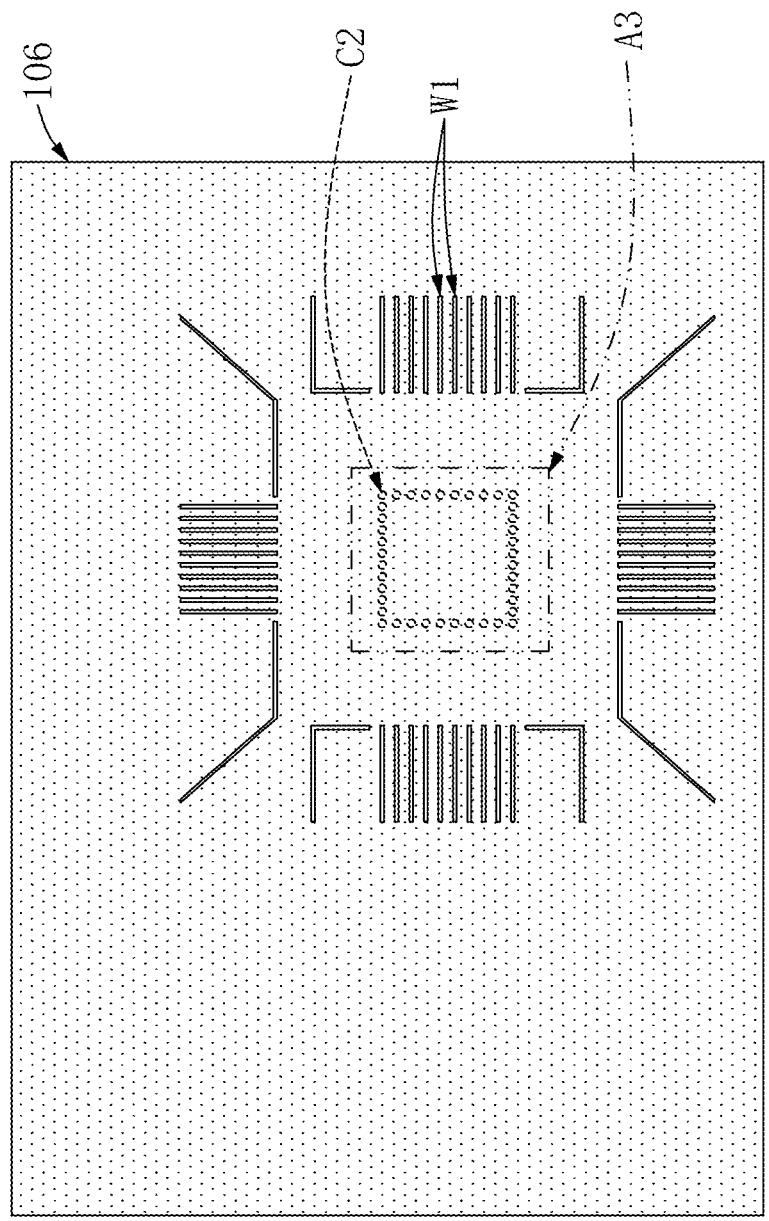
FIG. 4 is a schematic top view of a fourth layer of the sensing touchpad according to one embodiment of the present disclosure.

FIG. 4 is a schematic top view of the fourth layer of the sensing touchpad according to one embodiment of the present disclosure. Referring to FIG. 4, a part of the fourth layer 106 can be used as a trace routing layer, in which a plurality of first conductive wires W1 that are electrically connected to the sensing chip 16 can be arranged. In the case that the sensing chip 16 is the BGA packaged chip, a plurality of second conductive elements C2 are connected to the sensing chip 16. The second conductive elements C2 can be blind vias disposed in an area A3 and penetrate through the third layer 104 and at least a part of the fourth layer 106. It should be noted that the area A3 is an area of the sensing chip 16 projected onto the fourth layer 106.

As mentioned above, in the existing touchpad applications, the traces connected to the BGA package component need to use a large quantity of the blind vias, making the ground shielding layer incomplete, thereby losing the shielding effect for the driving electrodes. Differently, it can be seen from FIGS. 1 to 4 that the ground elements Eg, the second driving electrodes Ed2, the plurality of second conductive elements C2 and the sensing chip 16 overlap with one another, therefore the ground elements Eg can serve as an extension part of the ground shielding layer for eliminating the adverse effects of the ground shielding layer adapting to the BGA packaged chip.

Figure 5:
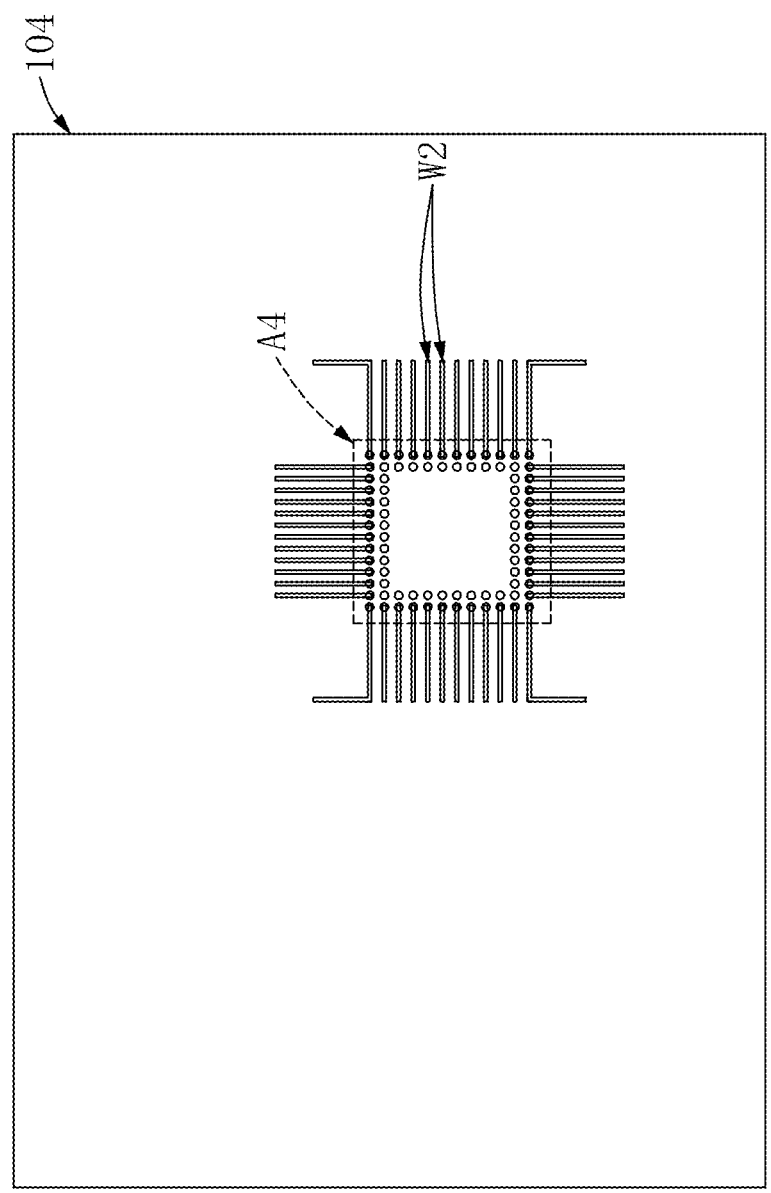
FIG. 5 is a schematic top view of a third layer of the sensing touchpad according to one embodiment of the present disclosure.

FIG. 5 is a schematic top view of a third layer of the sensing touchpad according to one embodiment of the present disclosure. Referring to FIG. 5, a plurality of second conductive wires W2 can be arranged in the third layer 104 of the substrate 10. The third layer 104 can be a layer for arranging the sensing chip 16, a grounding layer and a trace routing layer for arranging the second conductive wires W2 at the same time. The second conductive wires W2 can be connected to a plurality of ball pads disposed in an area A4, which is an area of the sensing chip 16 projected onto the third layer 104. The second conductive wires W2 can be electrically connected to the sensing chip 16 through the ball pads, respectively.

However, the aforementioned details are disclosed for exemplary purposes only, and are not meant to limit the scope of the present disclosure.

Beneficial Effects of the Embodiments

In conclusion, in the sensing touchpad provided by the present disclosure, the ground elements, the second driving electrodes, the second conductive elements and the sensing chip overlap with one another, therefore the ground elements can serve as an extension part of the ground shielding layer for eliminating the adverse effects of the ground shielding layer adapting to the BGA packaged chip.

Therefore, even if specific packaged components that requires a large quantity of blind vias are used, the sensing touchpad provided by the present disclosure can enhance the shielding effect without increasing a quantity of layers, thus the cost can be reduced without affecting the touch performance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensing touchpad, comprising:
    a substrate having a first surface and a second surface opposite to each other;
    a plurality of first driving electrodes arranged in a first layer on the top surface of the substrate;
    a plurality of sensing electrodes arranged in a second layer on the first layer;
    at least one second driving electrode arranged in the second layer; and
    at least one ground element arranged in the first layer, wherein the at least one ground element overlaps with the at least one second driving electrode on a normal direction of the substrate.

2. The sensing touchpad according to claim 1, wherein the at least one second driving electrode is electrically connected to at least one of the first driving electrodes through at least one first conductive element in the at least one ground element.

3. The sensing touchpad according to claim 2, further comprising:
    a sensing chip mounted on the second surface, wherein the sensing chip is electrically connected to the plurality of first driving electrodes, the plurality of sensing electrodes and the at least one second driving electrode.

4. The sensing touchpad according to claim 2, wherein each of the at least one first conductive element is a conductive via or a conductive through-hole.

5. The sensing touchpad according to claim 3, further comprising a plurality of second conductive elements connected to the sensing chip, wherein the substrate includes:
    a third layer; and
    a fourth layer arranged on the third layer,
    wherein the plurality of second conductive elements penetrate through the third layer and at least a part of the fourth layer.

6. The sensing touchpad according to claim 5, wherein the at least one ground element, the at least one second driving electrode, at least one of the plurality of second conductive elements and the sensing chip overlap with one another.

7. The sensing touchpad according to claim 5, wherein the fourth layer is a ground layer, and the at least one ground element extends from the fourth layer to the first layer.

8. The sensing touchpad according to claim 2, wherein the sensing chip is a ball-grid array (BGA) packaged chip, and each of the second conductive elements is a conductive via.

9. The sensing touchpad according to claim 7, further comprising a plurality of first conductive wires arranged in the fourth layer of the substrate.

10. The sensing touchpad according to claim 7, further comprising a plurality of second conductive wires arranged in the third layer of the substrate.

11. The sensing touchpad according to claim 2, wherein the plurality of first driving electrodes are arranged to form a first matrix, the first matrix includes a plurality of columns, and the first driving electrodes are connected in series along a first direction in each of the columns.

12. The sensing touchpad according to claim 2, wherein the sensing electrodes are arranged to form a second matrix, the second matrix includes a plurality of first rows and a plurality of second rows that are arranged alternately along the first direction, and in each of the second rows, a part of the sensing electrodes are connected in series along a second direction cross the first direction.

13. The sensing touchpad according to claim 12, wherein the at least one second driving electrode is in alignment with at least one of the plurality of sensing electrodes.

14. The sensing touchpad according to claim 11, wherein the first matrix has at least one empty element, and the ground element is arranged at a position corresponding to the at least one empty element.

* * * * *